(12) United States Patent
Gratsias et al.

(10) Patent No.: US 8,763,256 B2
(45) Date of Patent: Jul. 1, 2014

(54) VIBRATING WET SHAVER

(75) Inventors: Spiros Gratsias, Kypseli (GR); Ioannis Bozikis, Athens (GR); Dimitris Efthimiadis, Athens (GR)

(73) Assignee: Bic-Violex S.A., Anixi, Attiki (GR)

( * ) Notice: Subject to any disclaimer, the term of this patent is extended or adjusted under 35 U.S.C. 154(b) by 1967 days.

(21) Appl. No.: 11/576,107

(22) PCT Filed: Oct. 4, 2004

(86) PCT No.: PCT/EP2004/011045
§ 371 (c)(1),
(2), (4) Date: Jun. 4, 2007

(87) PCT Pub. No.: WO2006/037358
PCT Pub. Date: Apr. 13, 2006

(65) Prior Publication Data
US 2009/0199406 A1   Aug. 13, 2009

(51) Int. Cl.
*B26B 19/28*   (2006.01)

(52) U.S. Cl.
USPC .................................................. 30/45; 30/44

(58) Field of Classification Search
USPC ....................................... 30/44, 45
See application file for complete search history.

(56) References Cited

U.S. PATENT DOCUMENTS

| | | | |
|---|---|---|---|
| 2,567,375 A | 9/1951 | Harshberger | |
| 3,610,080 A | 10/1971 | Kuris | |
| 3,611,568 A * | 10/1971 | Alexander | 30/45 |
| 3,636,627 A * | 1/1972 | Tiffin | 30/45 |
| 4,450,392 A | 5/1984 | Gaslonde | |
| 4,744,144 A * | 5/1988 | Lowery et al. | 30/45 |
| 4,914,816 A * | 4/1990 | Fenn et al. | 30/45 |
| 4,918,818 A * | 4/1990 | Hsieh | 30/34.05 |
| 5,007,169 A * | 4/1991 | Motta | 30/45 |
| 5,046,249 A * | 9/1991 | Kawara et al. | 30/45 |
| 5,088,037 A * | 2/1992 | Battaglia | 600/300 |
| 5,214,851 A | 6/1993 | Althaus | |
| 5,299,354 A * | 4/1994 | Metcalf et al. | 30/45 |
| 6,421,918 B1 * | 7/2002 | Dato et al. | 30/45 |
| 6,424,791 B1 * | 7/2002 | Saib | 386/83 |
| 6,437,836 B1 * | 8/2002 | Huang et al. | 348/734 |
| 6,836,966 B2 * | 1/2005 | Patrick | 30/34.05 |
| 7,028,405 B2 * | 4/2006 | Paas et al. | 30/45 |
| 7,240,390 B2 * | 7/2007 | Pfenniger et al. | 15/22.1 |
| 2002/0039720 A1 | 4/2002 | Marx et al. | |
| 2003/0090229 A1 | 5/2003 | Gray et al. | |
| 2004/0172831 A1 | 9/2004 | Paas et al. | |
| 2005/0125919 A1 * | 6/2005 | Fattori | 15/22.1 |
| 2005/0172493 A1 * | 8/2005 | Fischer et al. | 30/45 |
| 2008/0098603 A1 * | 5/2008 | Noble et al. | 30/44 |

FOREIGN PATENT DOCUMENTS

| | | |
|---|---|---|
| CN | 1031040 A | 2/1989 |
| DE | 196 54 557 A1 | 7/1998 |
| EP | 0 840 440 A2 | 5/1998 |
| EP | 1 095 630 A2 | 5/2001 |
| GB | 450 687 | 7/1936 |
| GB | 2 399 045 | 9/2004 |
| JP | 8-186951 | 7/1996 |

* cited by examiner

*Primary Examiner* — Hwei C Payer
(74) *Attorney, Agent, or Firm* — Jones Day

(57) ABSTRACT

A vibrating wet shaver that includes a hollow handle, a shaving head borne by the handle, an electric vibrator fixed to the handle for transmitting vibrations to the shaving head through the handle, and a control circuit adapted to adjust a vibration frequency generated by the electric vibrator.

6 Claims, 9 Drawing Sheets

VIBRATING WET SHAVER

This application is a national stage application of PCT/FR2004/011045, filed on Oct. 4, 2004, the entire contents of which is incorporated herein.

FIELD OF THE INVENTION

The embodiments of the present invention relate to vibrating shavers.

BACKGROUND OF THE INVENTION

More precisely, the embodiments of the present invention relate to a vibrating wet shaver (i.e., a shaver the blades of which are not driven by a motor relative to the shaving head) comprising:
a hollow handle,
a shaving head borne by the handle,
an electric vibrator fixed to the handle, for transmitting vibrations to the shaving head through the handle.

U.S. Pat. No. 5,299,354 discloses an example of such a known vibrating shaver, in which the vibrator vibrates at a single frequency.

OBJECTS AND SUMMARY OF THE INVENTION

One objective of an embodiment of the present invention is to propose a new vibrating wet shaver enhancing the user's comfort.

To this end, according to an embodiment of the present invention, a vibrating shaver of the type in question further includes a control circuit which is adapted to adjust a vibration frequency generated by the electric vibrator.

Thanks to these dispositions, a user may adjust the frequency of the vibrations to his or her preferred frequency, thus enhancing the user's comfort.

In various embodiments of the present invention, one may possibly have recourse in addition to one and/or other of the following arrangements:
the electric vibrator includes a DC motor powered by a battery;
the DC motor is adapted to rotate an eccentric mass;
the control circuit is adapted to vary a voltage applied to the DC motor;
the control circuit includes several resistive devices and at least one switch enabling a user to selectively connect the resistive devices to a power supply circuit connecting the DC motor to the battery, thereby varying the voltage applied to the DC motor;
the resistive devices have different resistance values and the switch is adapted to selectively connect the resistive devices in series with the DC motor;
the control circuit includes a resistive device mounted in series with the DC motor, the resistive device having a resistance value, and the control circuit being adapted to vary the resistance value for varying the voltage;
the resistive device includes a potentiometer and an actuating member enabling a user to actuate the potentiometer;
the potentiometer has a switch-off position enabling to switch-off the DC motor;
the control circuit includes a pulse width modulation circuit adapted to apply a voltage with a varying duty cycle to the DC motor; the control circuit is actuated by an actuating member which is movably mounted on the handle between several predetermined indexed positions corresponding respectively to several vibration frequencies;
the control circuit is actuated by an actuating member which is movably mounted on the handle and the control circuit is adapted to continuously vary the vibration frequency when the actuating member is moved;
the control circuit is actuated by at least a first actuating member which is mounted on the handle and the control circuit is adapted to vary the vibration frequency step-by-step each time the first actuating member is actuated;
the first actuating member is a pushbutton;
the control circuit is also actuated by at least a second actuating member which is mounted on the handle, the control circuit is adapted to step-up the vibration frequency each time the first actuating member is actuated and to step-down the vibration frequency each time the second actuating member is actuated;
the second actuating member is a pushbutton;
the control circuit further includes a visual indicator adapted to indicate the vibration frequency to a user;
the handle extends longitudinally between a proximal portion and a distal portion bearing the shaving head, the electric vibrator being situated close to the distal portion;
the handle further includes a battery housing which is situated between the electric vibrator and the proximal portion;
the proximal portion of the handle includes a removable end cap which enables to open the battery housing in order to exchange batteries.

BRIEF DESCRIPTION OF THE DRAWINGS

Other features and advantages of the embodiments of the present invention appear from the following detailed description of one of its embodiments, given by way of non-limiting example, and with reference to the accompanying drawings.

In the drawings:
FIG. 4 is a block diagram of the electric parts of the shaver of FIG. 1.

In the figures, the same references denote identical or similar elements.

FIG. 1 shows a wet shaver 1, i.e. a shaver the blades of which are not driven by a motor relative to the shaving head.

Figure 1:
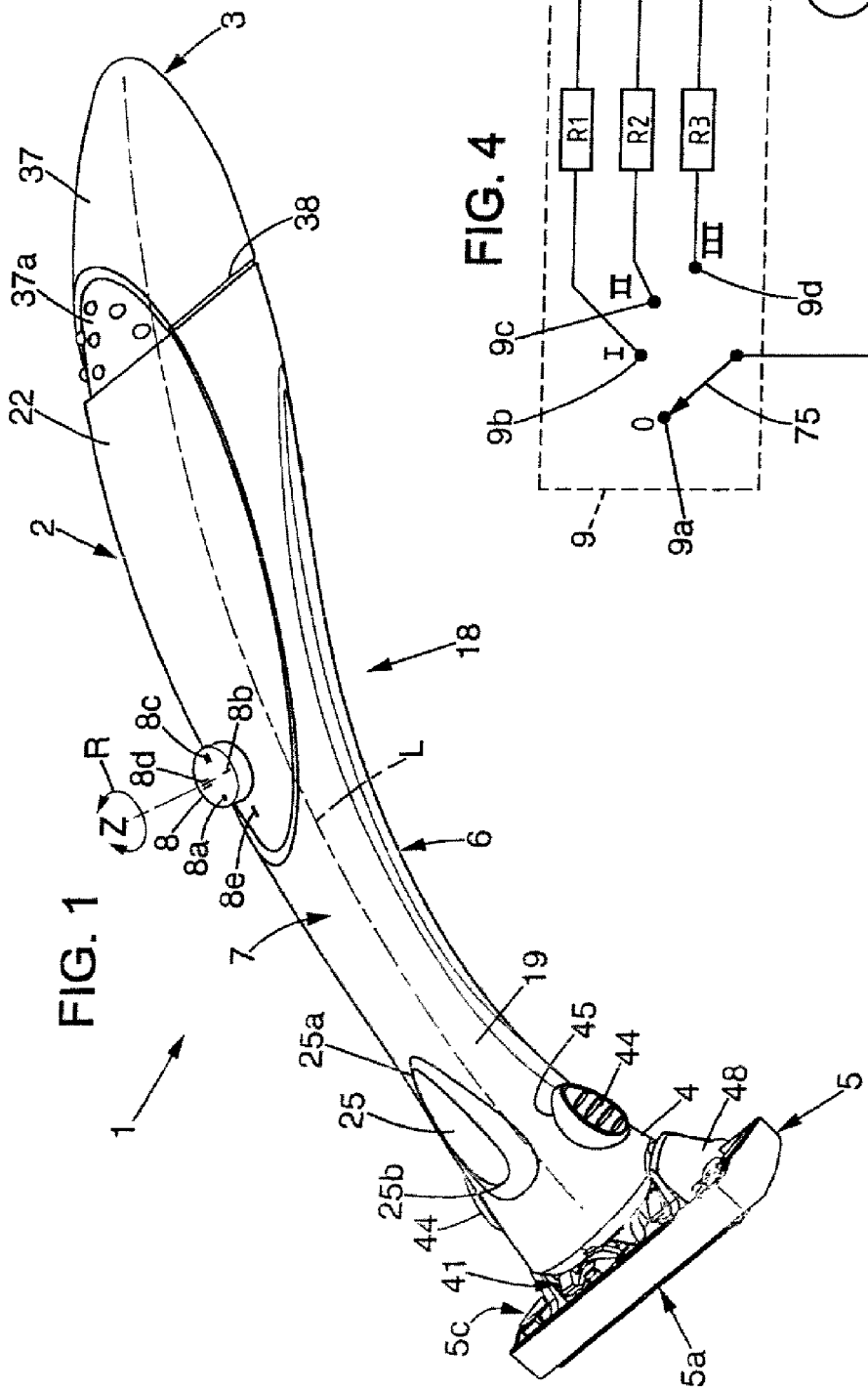
FIG. 1 is a perspective view of a shaver according to a first embodiment of the invention.

The shaver 1 includes a hollow handle 2 extending in a longitudinal direction L between a proximal portion 3 and a distal portion 4 bearing a shaving head 5. The shaving head 5 includes a front face 5a equipped with one or several blades 5b and a rear face 5c which is connected to the handle 2.

The longitudinal direction L may be curved or include one or several straight portions. In the present case, the longitudinal direction L is curved, with a concavity which is constantly directed toward the underside 6 of the handle (i.e. the side of the handle which faces substantially the same direction as the front face 5a of the shaving head).

The shaver may further include, for instance on the top side 7 of the handle (i.e. the side of the handle which faces opposite the front face 5a of the shaving head), an actuating member 8 which enables to actuate a control circuit 9 (see FIGS. 2 and 3) mounted inside the hollow handle 2, for controlling the generation of vibrations in the shaver and the frequency of these vibrations.

In the example shown in the drawing, the actuating member 8 is a button which is rotatably mounted on the handle 2 around an axis of rotation Z (as indicated by arrow R in FIG. 1) which is substantially perpendicular to the longitudinal direction L and which is comprised in a medial plane of symmetry of the shaver 1.

In this example, the actuating member 8 is movable between several predetermined indexed positions where indexes 8a (0), 8b (I), 8c (II), 8d (III) are respectively in register with a fixed index 8e borne by the handle 2. The actuating member 8 actuates a control circuit 9 FIG. 2) which turn controls an electric vibrator 11 for generating vibrations and for transmitting them to the handle 2.

The electric vibrator 11 may include for instance:
an electric motor 12 having a rigid outer casing 13,
an output shaft 14 rotated by the electric motor 12,
and an eccentric mass 15 which is mounted on the output shaft 14.

As shown in FIG. 4, the control circuit 9 may include several resistive devices, for instance three resistors R1, R2, R3, and a switch 75 which is connected to the actuating member 8. The switch 75 is a multi position switch which has, in this example, four terminals 9a, 9b, 9c, 9d corresponding respectively to the four indexed positions 0, I, II, III of the actuating member.

The control circuit 9 is mounted in series with DC motor 12 in the supply circuit 76 which supplies DC motor 12 with electricity from the battery 36. In the example shown in FIG. 4, one of the terminals of DC motor 12 is directly connected to one of the terminals of the battery 36, whereas the other terminal of the battery 36 is connected to the multi position switch 75 and the other terminal of the DC motor 12 is connected in parallel to terminals 9b, 9c, 9d, respectively through the resistor R1, R2, R3. The terminal 9a of the multi position switch is not connected to DC motor 12. Thus, when the actuating member 8 is rotated to have its index 8a (0) in register with fixed index 8e, the multi position switch 75 opens the power supply circuit 76, so that DC motor 12 is stopped and no vibrations are generated.

When the actuating member 8 is turned so that one of its indexes 8b (I), 8c (II), 8d (III) is in register with the fixed index 8e, the multi position switch 75 closes the power supply circuit and an electric current is fed to the DC motor 12 through one of the resistors R1, R2, R3. Since these resistors have different resistance value (resistor R3 may have the smaller value and resistor R1 may have the higher value), the positions I, II, III of the actuating member correspond respectively to different voltages applied to the DC motor 12 (the applied voltage is higher in position II than in position I and higher in position III than in position II). Therefore, the speed of rotation of the DC motor 12, and thus the frequency of vibrations, varies according to the position of the actuating member 8 (the vibration frequency is higher in position II than in position I and higher in position III than in position II).

It should be noted that, instead of having a rotary actuating member 8, the actuating member controlling the multi position switch could have a linear movement on the handle 2. Further, the multi position switch 75 could be mounted so as to successively connect the resistors R1, R2, R3 in series with each other and with motor 12 according to the position of the actuating member, instead of connecting the resistors only one by one in series with the motor 12.

The rigid outer casing 13 of the electric motor 12 may be tightly fitted in the handle 2, in the vicinity of the distal portion 4, possibly with interposition of an elastomeric layer 16 between the casing and the handle. The thickness of such layer may be comprised for instance between 0.4 and 1 mm. The elastomeric layer 16 may for instance be a silicone layer or more generally may comprise such silicone layer, and the elastomeric layer may have a Shore hardness comprised for instance between 70 Shore A and 90 Shore A. The Shore hardness may be for instance around 75 Shore A.

Figure 2:
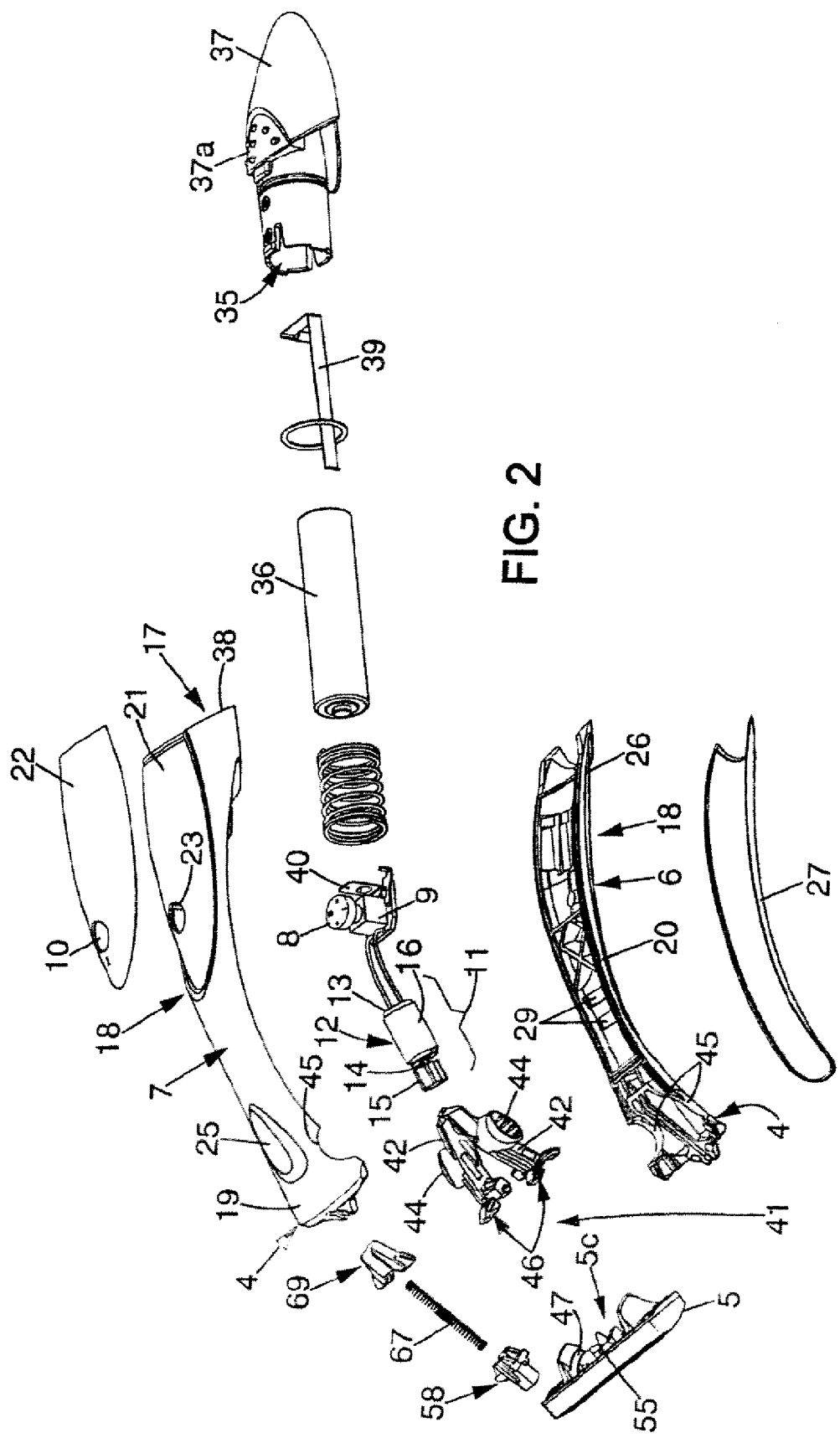
FIG. 2 is an exploded perspective of the shaver of FIG. 1.
Figure 3:
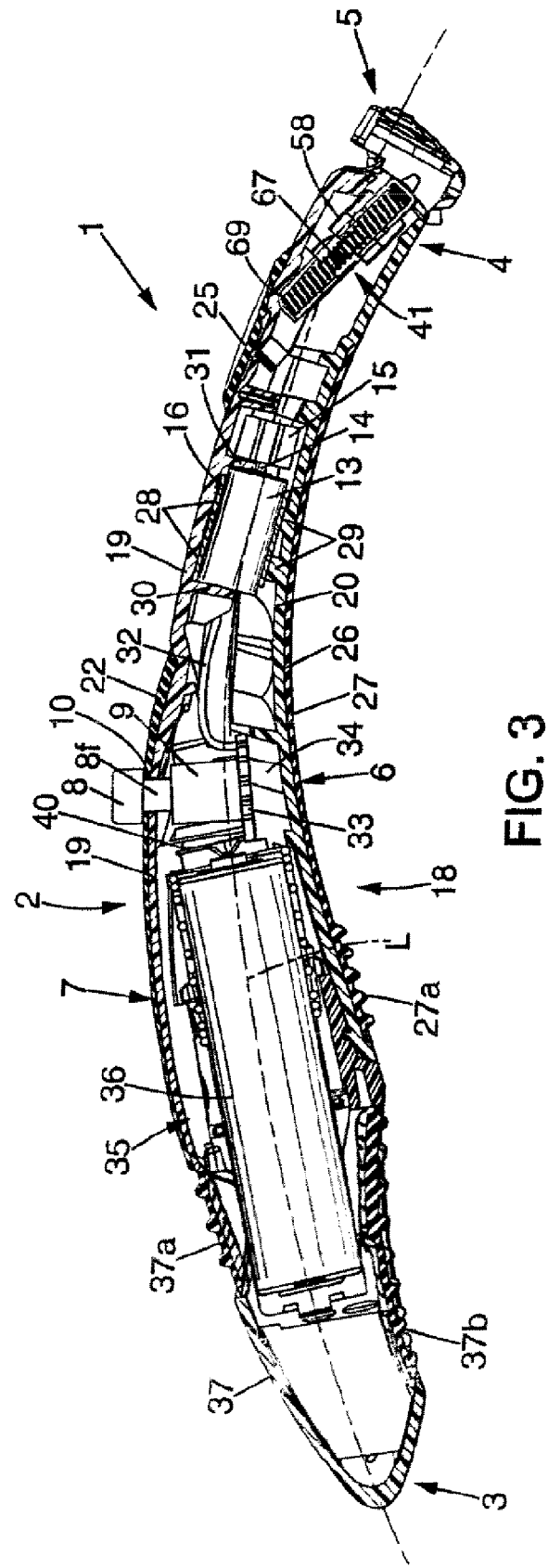
FIG. 3 is a longitudinal cross section of the shaver of FIG. 1.

In the example considered here, as shown for instance in FIGS. 2 and 3, the handle may include a substantially rigid hollow body 17 (as opposed to softer elastomeric parts of the handle), made out for instance of plastic material, e.g. of molded thermoplastic.

The body 17 may form the distal portion 4 of the handle and the medial portion 18 of the handle, and the body 17 may comprise:
a first body portion 19 forming for instance part of the top side 7 of the handle,
and a second body portion 20 which may form for instance part of the underside 6 of the handle.

The first body portion 19 may include a recessed portion 21 on which is fixed an elastomeric trim 22 which includes the flexible wall 8 in correspondence with a hole 23 which is hollowed out in the recessed portion 21 in correspondence with the actuating member 8. The actuating member includes a shaft 8f or other connecting portion (see FIG. 3) which goes through the hole 23 and is connected to the control circuit 9.

Besides, the first body portion 19 may also include, in the example shown in the drawings, an index pad 25 on which the index finger of the user of the shaver may rest (see in particular FIG. 2). This index pad 25 may for instance extend with an increasing width, between a rear tip 25a and a front end which is wider than the rear tip and which is closer to the shaving head 5. The index pad 25 may be made for instance out of elastomer.

Besides, as shown for instance on FIGS. 2 and 3, the second body portion 20 may also include an outer recessed portion 26 in which is fixed a further elastomeric trim 27. The trim 27 may include for instance transverse ribs 27a at the end of the trim which is opposite the distal portion 4 of the handle.

The elastomeric trims 22, 27 may be fixed to the corresponding body portions 19, 20 by any suitable means, for instance by co-injection.

The first and second body portions 19, 20 are facing each other in the direction of axis Z.

The first and second body portions 19, 20 may be fixed together by fitting and by ultrasonic welding. However, the first and second body portions could be fixed together by any other means, such as snap fitting, gluing, etc.

The casing 13 of the motor may be for instance tightly fitted between:
at least one, for instance two concave bearing surfaces 28 belonging to the first body portion 19 and facing toward the second body portion 20 (see FIG. 3), and at least one, for instance two second concave bearing surfaces 29 belonging to the second body portion 20 and facing toward the first body portion 19 (see FIGS. 2 and 3).

These first and second bearing surfaces may be either in mutual correspondence on both sides of the motor 12 or axially offset along the longitudinal direction L of the motor 12.

As shown in FIG. 3, the casing 13 of the motor is also axially fitted between two abutments, parallel to the longitudinal direction L, to with a rear abutment 30 belonging for instance to the first body portion and a front abutment 31 which may also belong to the first body portion.

The front abutment 31 may include a cut out (not shown) for the output shaft 14 of the motor, the front abutment being axially interposed between the casing 13 and the eccentric mass 15, preferably without contact between front abutment 31 and the eccentric mass 15.

As shown in FIG. 3, the control circuit 9 is mounted between the vibrator 11 and the proximal portion 3 of the handle, close to the vibrator 3, and is connected to the motor 12 by electric wires 32. The control circuit 9 may be fixed to or include a base plate 33 such as an electronic circuit board, which is itself fitted in support members 34 belonging for instance to the first body portion 19.

Besides, the handle further includes a battery housing 35 (see FIGS. 3 and 4) which is situated between the control circuit 9 and the proximal portion 3. This battery housing is adapted to receive a battery 36 extending longitudinally substantially parallel to the longitudinal direction L of the handle. This battery may be inserted in and removed from the battery housing 35 parallel to the longitudinal direction L, after removing an end cap 37 which forms the proximal portion 3 of the handle and which is axially fitted at the rear open end 38 of the body 17, the rear end being formed for instance by a portion of circular cross section of the first body portion 19, opposite to the shaving head 5.

As shown in FIGS. 2 and 4, the battery housing may further include two electrical contacts 39, 40 for connecting the battery to the switch. The electrical contact 39 may be in the form of a metallic strip which is fitted inside the end cap 37.

Besides, the end cap 37 may include for instance an upper finger rest portion 37a with protruding dots on the top surface of the handle, and a lower flattened portion 37b also with protruding dots. Both upper finger rest portion 37a and lower flattened portion 37b may be formed for instance out of elastomer or include an elastomeric trim.

As discussed previously, the distal portion 4 of the razor handle bears the shaving head 5. In the example shown in the drawings, the rear face 5c of the shaving head is connected to the handle 2 by a lock/release mechanism 41 which is shown in greater details in FIG. 5 and described in international applications PCT/EP04/010772 and PCT/FR04/010774 filed on Sep. 7, 2004.

This lock/release mechanism 41 enables a person of ordinary skill in the Art to selectively:
  either connect the shaving head 5 to the handle,
  or release the shaving head in order to exchange shaving heads.

Figure 5:
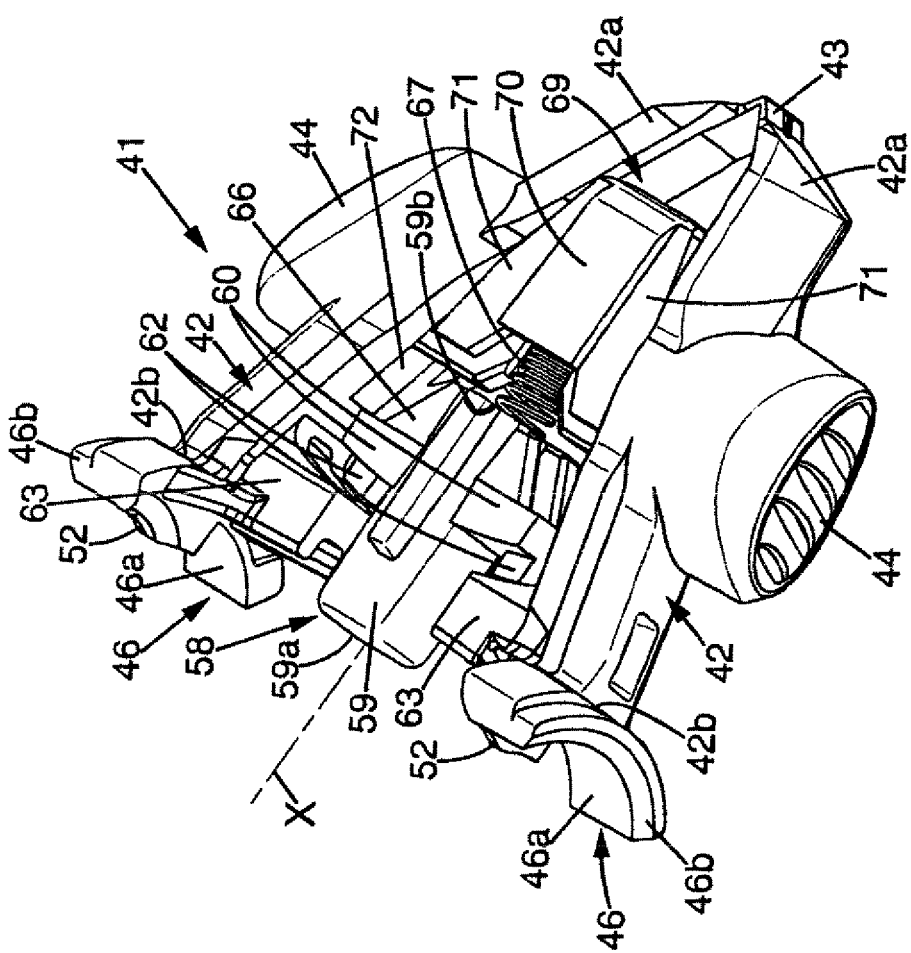
FIG. 5 is a perspective view, of the lock/release mechanism connecting the razor handle to the shaving head in the shaver of FIG. 1.

As shown in FIGS. 2 and 5, the lock/release mechanism 41 includes two arms 42 which can be made for instance out of molded plastic material. The arms 42 may each extend from a first end 42a situated inside the handle body 17 toward a second end 42b which may protrude toward the outside at the distal portion 4 of the handle 2. The two arms may be disposed in a V shape, diverging from a medial axis X from their first end 42a toward their second end 42b. The medial axis X is substantially parallel to the curved longitudinal axis L of the handle.

The first ends 42a of the two arms 42 may be connected together by a hinge 43, formed for instance as a thin bridge of plastic material connecting the two arms 42 to each other when the arms are molded as a single piece. The hinge 43 may have a negligible resilient action, or no resilient action, on the two arms 42.

The two arms 42 further include respectively two pushbuttons 4 which may be formed integrally therewith and which may protrude laterally out of the handle body 17, for instance through two holes 45 formed in the handle body (see FIGS. 1 and 2).

Returning to FIGS. 2 and 5, the second ends 42b of the arms 42 may include respectively two bearings, in particular two shell bearings 46 which are exposed toward the outside. Each shell bearing 46 may for instance include a cylindrical concave front face 46a and a lateral edge 46b which protrudes outwardly and which has also a cylindrical shape. The two front faces 46a and the two lateral edges 46b have the same cylindrical axis, corresponding to the axis of rotation of the shaving head 5.

Figure 6:
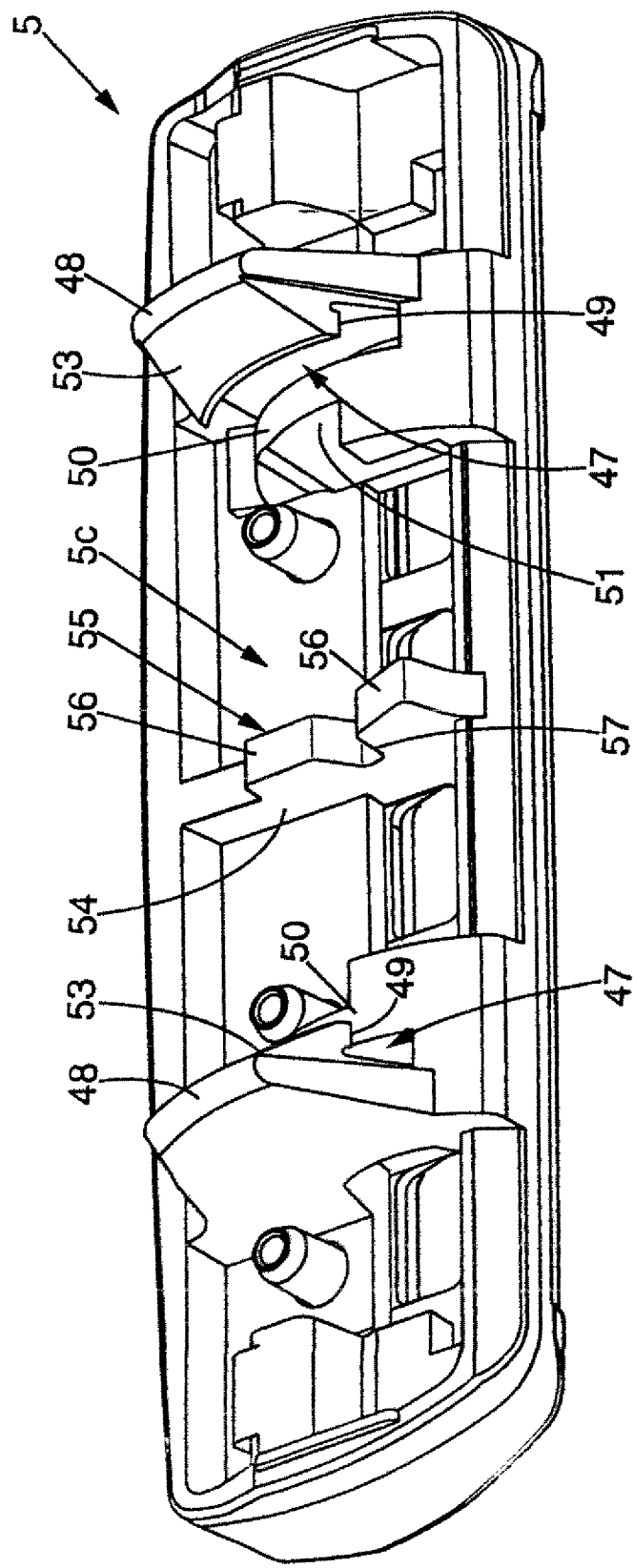
FIG. 6 is a rear view of the shaving head in the shaver of FIG. 1,
FIGS. 7, 8, 9 are respectively similar to FIGS. 1, 2, 4, for a shaver according to a second embodiment of the present invention.

As shown in FIG. 6, the rear face 5c of the shaving head may include two inwardly facing arcuate slots 47 shaped in correspondence with the lateral edges 46b of the shell bearings and adapted to receive the lateral edges for pivotally mounting the shaving head 5 onto the handle 2. These arcuate slots 47 may be formed respectively in two protruding ribs 48 and may be limited:
  toward the handle, by a first arcuate concave surface 49 facing toward the shaving head 5,
  and away from the handle, by a larger second arcuate convex surface 50 facing toward the handle 2.

The front faces 46a of the shell bearings 46 bear respectively on the arcuate convex surfaces 50. The arcuate convex surfaces 50 may include respectively two notches 51 for receiving corresponding protrusions 52 of the shell bearings 46 (see FIG. 5), so as to limit the angular range of rotation of the shaving head 5.

Besides, as shown in FIG. 6, the ribs 48 may include two inclined surfaces 53 facing each other and extending slantwise toward each other from the top of the ribs 48 toward the arcuate slots 47, so as to facilitate the insertion of the shell bearings 46 in the arcuate slots 47.

The rear face 5c of the shaving head 5 may further include a central rib 54 having an edge forming a top cam surface 55 facing away from the shaving head 5 toward the handle 2. The cam surface 55 may have a general V shape, and may for instance include two substantially flat surfaces 56 which are slightly inclined relative to one another and which may be for instance separated from one another by a notch 57 hollowed out in the rib 54 in order (e.g. to adapt the shaving head 5 on another type of handle having a flexible tongue which is inserted into the notch 57).

Returning to FIGS. 2 and 5, the lock/release mechanism 41 also includes a plunger 58 which is movably mounted, substantially along the medial axis X between the two arms 42. This plunger 58 has a central body 59 and two lateral wings 60 extending opposite to one another toward the two arms 42. The central body 59 extends longitudinally parallel to the medial axis X, between a first, substantially flat free end 59a which bears again-St the cam surface 55 of the shaving head, and a second end 59b facing away from the shaving head 5.

Each lateral wing 60 may include a detent 62 protruding parallel to the medial axis X toward the shaving head 5, the detent facing an inwardly extending protrusion 63 belonging to the corresponding arm 42. Each protrusion 63 has an opening (not shown) which is adapted to receive the corresponding detent 62.

The plunger 58 is elastically biased toward the cam surface 55 of the shaving head so as to cooperate therewith by camming action to bias the shaving head in rotation toward a rest position. In the example shown in the drawings, the plunger 58 is elastically biased by a spring 67, for instance a helicoidal spring, which is mounted between an arm pusher 69 and the second end 59b of the central body of the plunger.

The arm pusher 69 is disposed between the arms 42 in line win the plunger 58 along the medial axis X. The arm pusher 69 is disposed between the plunger 58 and the hinge 43 along the medial axis X.

The arm pusher is slidably mounted between the arms 42, substantially parallel to the medial axis X and is elastically biased by the spring 67 toward the handle, i.e. away from the shaving head 5. The arm pusher 69 cooperates by camming action with the two arms 42 for biasing the arms outwardly away from each other, toward a head locking position shown in FIGS. 1, 2 and 5, where the lateral edges 46b of the shell bearings 46 penetrate in the corresponding arcuate slots 47 of the shaving head.

The arm pusher 69 may have a central body 70 and two lateral extensions 71 extending opposite to one another toward the two arms 42 and cooperating by camming action respectively with the two arms for biasing the arms toward the head locking position.

More particularly, the lateral extensions 71 may penetrate in two slots 72 formed respectively in the two arms and facing each other.

Thanks to these dispositions, the same spring 67 is used to bias the plunger 58 elastically toward the cam surface 55 of the shaving head and to bias the arm pusher 69 away from the shaving head, thus biasing both the shaving head in rotation toward the rest position and the arms 42 toward the head locking position.

When a shaving head 5 is mounted on the handle 2, the lock/release mechanism 41 is normally in the head lock position. Starting from this position, when a user wishes to exchange shavings heads, he first pushes on both pushbuttons 44, which rotates the arm 42 toward each other against the camming action of the arm pusher 69. During this movement, the arm pusher 69 slides along the medial axis X toward the plunger 58. When the arms 42 have sufficiently rotated toward each other to reach their head release position (not shown), the head is released by the shell bearings 46 and is simultaneously ejected by the plunger 58.

Figure 11:
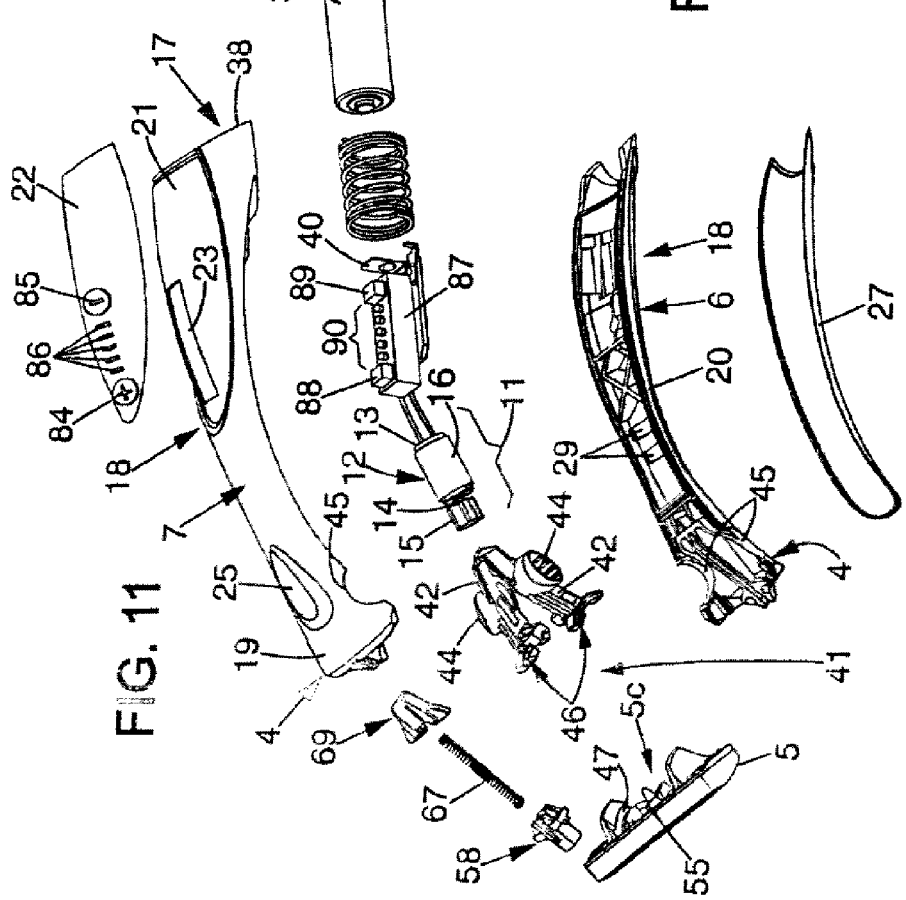

The plunger 58 then moves forward to an outwardly protruding position, so that the detents 62 of the plunger penetrate in the recesses of the extensions 63 of the arms. In this position, as shown in FIG. 11, the arms 42 are maintained in the head release position by hooking action of the extensions 63 with the detents 62.

Afterwards, when a new shaving head 5 is fixed to the handle 2, the shell bearings 46 are inserted between the arcuate slots 47 of the new shaving head 5 and the cam surface 55 of the new shaving head pushes the plunger 58 backward toward the handle. The arms 42 are then released and rotate away from each other under the action of the arm pusher 69, so that the shell bearings 46 insert themselves in the arcuate slots 47 of the new shaving head, and the lock/release mechanism 41 is again in the position shown in FIGS. 1, 2, 5.

Figure 7:
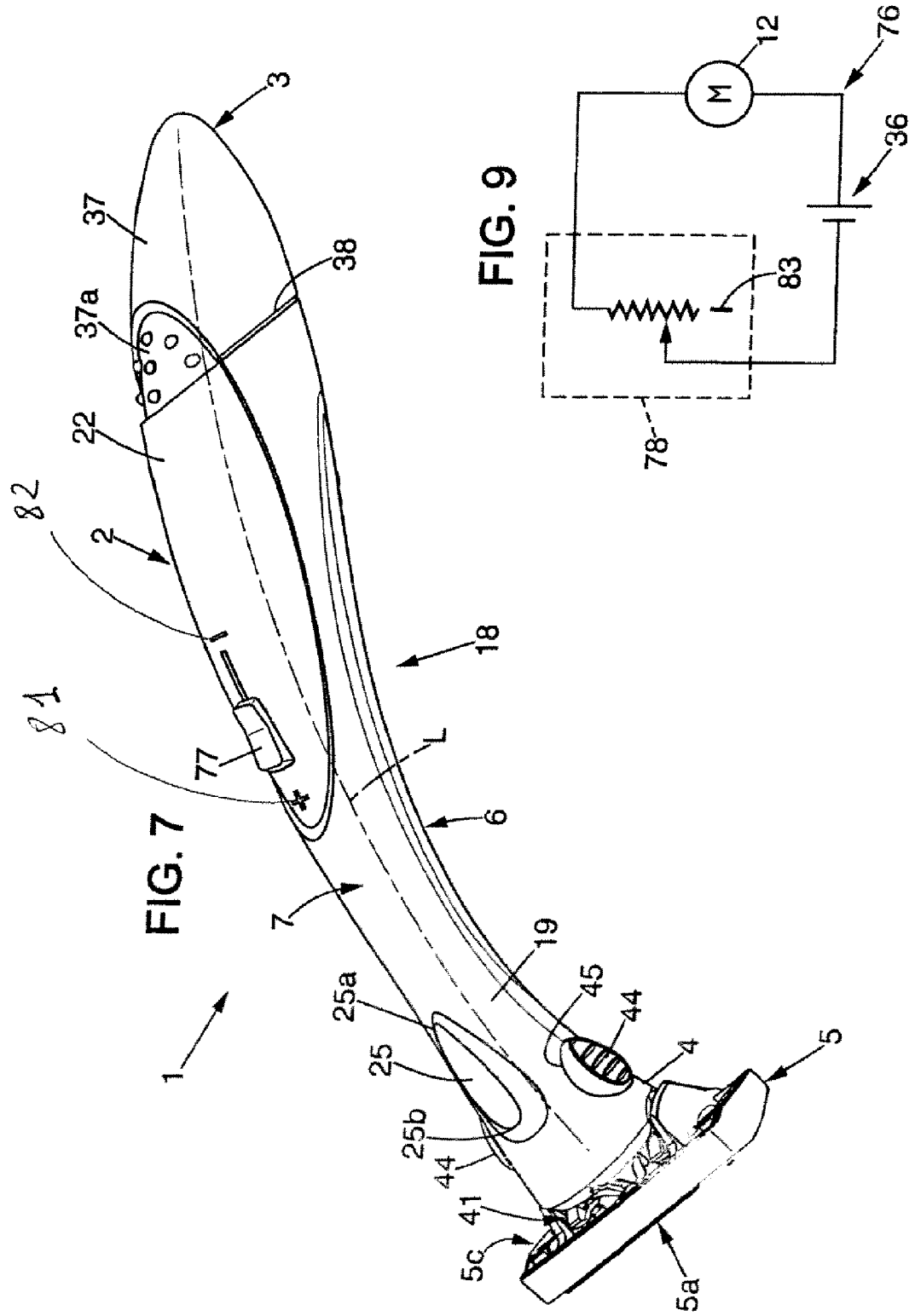
Figure 8:
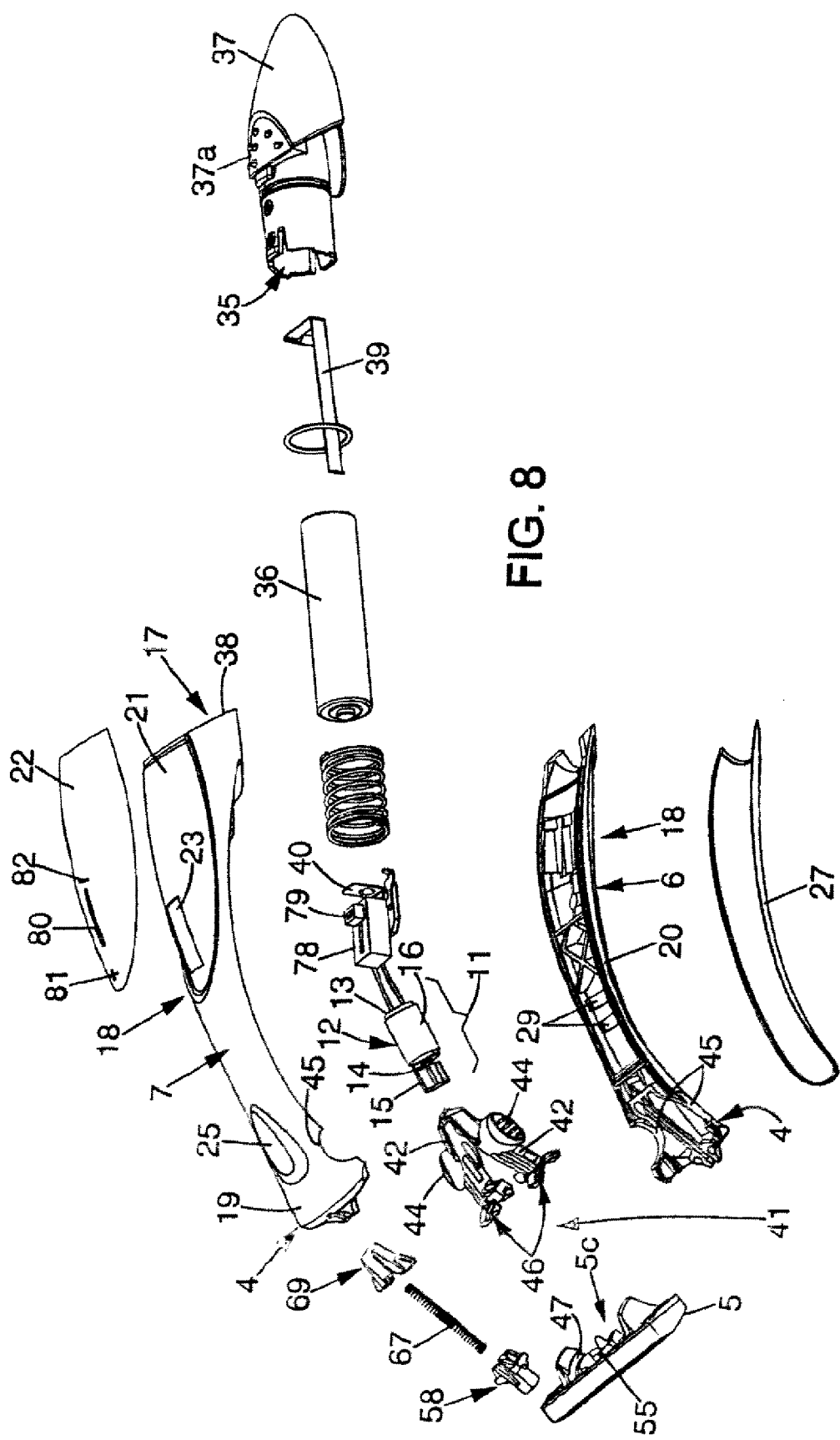

The embodiment of FIGS. 7-9 is similar to the embodiment of FIGS. 1-6 in many respects, and thus will not be described in details. This embodiment of FIGS. 7-9 distinguishes over that of FIGS. 1-6 by the following features:

in the embodiment of FIGS. 7-9, the control circuit 78 includes a potentiometer which is controlled for instance by a sliding button 77 which is slidingly mounted on the handle 2 and which is fitted on a sliding member 79 of the control circuit 78. The connection between the sliding button 77 and the sliding member 79 goes through the hole 23 already mentioned above, which has here a rectangular shape, and through a slit 80 made in the trim 22. The trim 22 may bear signs 80, 82 such as "+" "-", to indicate in which way the sliding button 77 should be moved to increase or decrease the frequency of vibrations.

As shown in FIG. 9, the control circuit 78 has a position 83 in which the power supply circuit 76 is open, thus enabling to switch off the DC motor 12, when the sliding button 77 is in the end position close to the "-" sign. When the push button 77 is moved from this end position corresponding to the switch off of the motor 12, the motor is energized through the power supply circuit 76 and the potentiometer, with a voltage which may be continuously varied by movement of the sliding button 77, thus enabling to continuously vary the frequency of vibrations.

It should be noted that, instead of a sliding button 77, the potentiometer could be a rotary potentiometer actuated by a rotary button.

Figure 10:
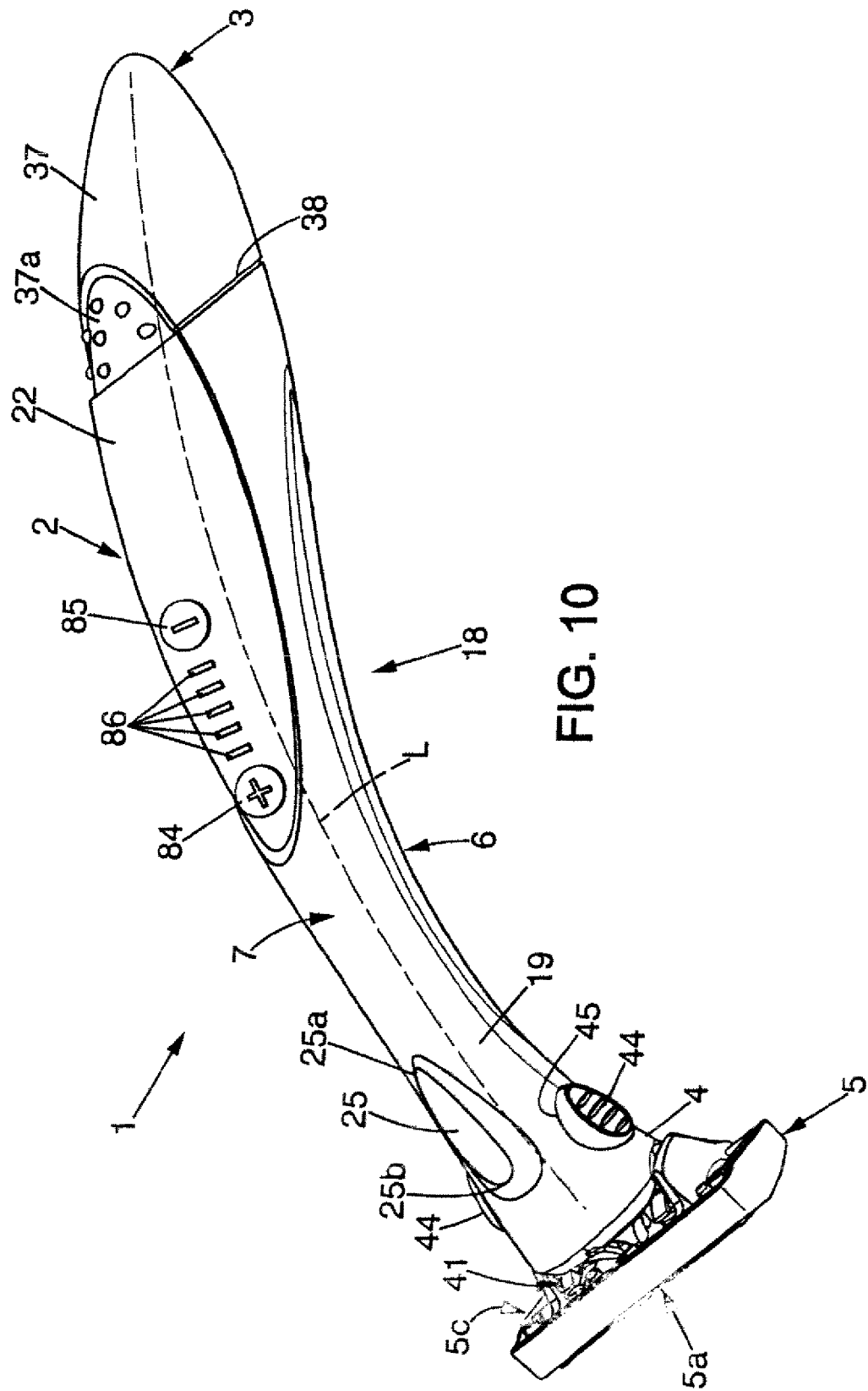
FIGS. 10, 11, 12 are respectively similar to FIGS. 1, 2, 4, for a shaver according to a third embodiment of the present invention.
Figure 12:
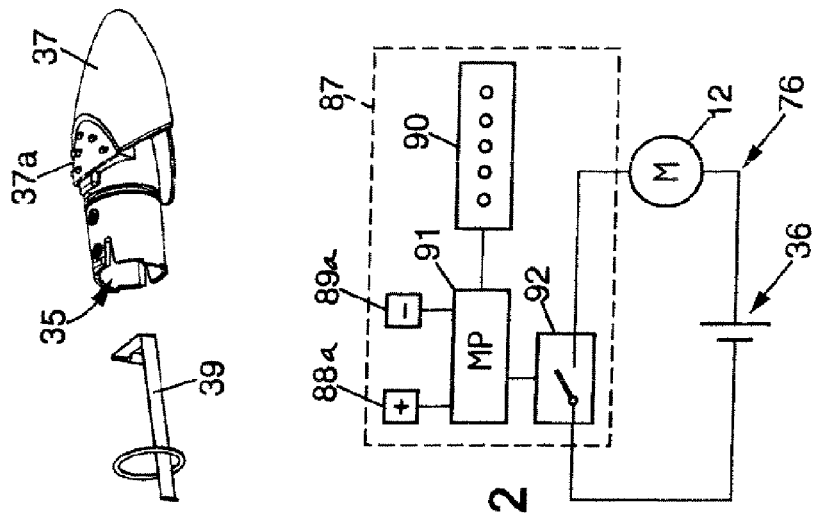

The embodiment of FIGS. 10-12 is also similar in many respects to the embodiment of FIGS. 1-6 and thus will not be described in details either. This embodiment of FIGS. 10-12 distinguishes over that of FIGS. 1-6 by the fact that the handle 2 does not include any slidable or rotary actuating member, but two actuating members 88, 89, for instance two pushbuttons, which may be actuated by a user by pushing on corresponding zones 84, 85 of the elastomeric trim 22 through the rectangular hole 23, so as to control the operation of control circuit 87. The zones 84, 85 of only elastomeric trim may be indicated to a user for instance by signs such as "+" for the zone 84 and "-" for the zone 85. The control circuit may also include a visual indicator 90, such as a set of LEDs adapted to give a visual indication of the vibration frequency to the user.

For instance, when the visual indicator 90 is a set of LEDs, no LED is lighted when a DC motor 12 is switched off. The LEDs may be disposed in line between actuating members 89 and 88, and the number of LEDs being switched on, starting from the actuating member 89, is representative of the vibration frequency.

In the example shown in FIGS. 10-2, the LEDs of the visual indicator 90 may be made visible to the user through transparent or translucid areas 86 provided in the elastomeric trim 22 in register with the various LEDs of the visual indicator 90.

As shown in FIG. 12, in this example, the actuating members 88, 89, may correspond to two contacts 88a, 89a connected respectively to an electronic control circuit 91 (MP) such as a microprocessor or microcontroller, which controls the visual indicator 90 and an electronic switch 92 mounted in series in the power supply circuit between the battery 36 and the DC motor 12.

The electronic control circuit 91 and the electronic switch 92 constitute a pulse width modulation circuit which is adapted to apply the voltage of the battery 36 with a varying duty cycle to the DC motor 12, thus varying the apparent voltage applied to the DC motor 12.

This enables to vary the speed of rotation of the motor 12, and therefore the vibration frequency. Thus, by actuating the actuating members 88, 89, a user may respectively step up or step down the vibration frequency, each time one of these actuating members 88, 89 is actuated. Further, when the user actuates the push button 89 ("-") a sufficient number of times, the electronic control circuit 91 maintains the electronic switch 92 in the open position, thus switching off the vibrations.

We claim:

1. A vibrating wet shaver comprising:
    a hollow handle,
    a shaving head borne by the handle,
    an electric vibrator fixed to the handle, for transmitting vibrations to the shaving head through the handle, and
    a control circuit adapted to adjust a vibration frequency generated by the electric vibrator among several vibration frequencies,
    wherein the control circuit includes two actuating members, a first actuating member adapted to be voluntarily actuated by a user for increasing a vibration frequency generated by the electric vibrator and a second actuating member adapted to be voluntarily actuated by a user for decreasing and switching off the vibration frequency generated by the electric vibrator.

2. The vibrating wet shaver according to claim 1, wherein the control circuit is actuated by the first actuating member and the second actuating member which are mounted on the handle and the control circuit is adapted to vary the vibration frequency step-by-step each time the first actuating member or the second actuating member is actuated.

3. The vibrating wet shaver according to claim 2, wherein the first actuating member is a pushbutton.

4. The vibrating wet shaver according to claim 3, wherein the control circuit is adapted to step-up the vibration frequency each time the first actuating member is actuated and to step-down the vibration frequency each time the second actuating member is actuated.

5. The vibrating wet shaver according to claim 4, wherein the second actuating member is a pushbutton.

6. The vibrating wet shaver according to claim 5, wherein the control circuit further includes a visual indicator adapted to indicate the vibration frequency to a user.

* * * * *